United States Patent [19]

Takeda et al.

[11] Patent Number: 5,835,168
[45] Date of Patent: Nov. 10, 1998

[54] ACTIVE MATRIX LIQUID CRYSTAL HAVING CAPACITANCE ELECTRODES CONNECTED TO PIXEL ELECTRODES

[75] Inventors: Mamoru Takeda, Hirakata; Ikunori Kobayashi, Sakai, both of Japan

[73] Assignee: Matsushita Electric Industrial, Co., Ltd., Osaka-fu, Japan

[21] Appl. No.: 44,001

[22] Filed: Apr. 8, 1993

[30] Foreign Application Priority Data

Apr. 10, 1992 [JP] Japan ..................................... 4-090506

[51] Int. Cl.⁶ .............................. G02F 1/136; G02F 1/133
[52] U.S. Cl. .................................. 349/38; 349/39; 349/43
[58] Field of Search ................................ 359/59, 67, 87; 349/38, 44, 39, 110, 42, 111, 43; 257/59, 72; 345/92

[56] References Cited

U.S. PATENT DOCUMENTS

| | | | |
|---|---|---|---|
| 4,519,678 | 5/1985 | Komatsubara et al. | 359/74 |
| 4,582,395 | 4/1986 | Morozumi | 359/59 |
| 5,017,984 | 5/1991 | Tanaka et al. | 357/23.7 |
| 5,060,036 | 10/1991 | Choi | 359/59 |
| 5,162,933 | 11/1992 | Kakuda et al. | 359/67 |
| 5,182,661 | 1/1993 | Ikeda et al. | 359/59 |
| 5,212,574 | 5/1993 | Katayama et al. | 359/59 |
| 5,276,540 | 1/1994 | Okamoto et al. | 359/59 |
| 5,305,128 | 4/1994 | Stupp et al. | 349/39 |
| 5,335,102 | 8/1994 | Kanemori et al. | 359/59 |
| 5,339,181 | 8/1994 | Kim et al. | 359/59 |
| 5,402,254 | 3/1995 | Sasano et al. | 349/38 |
| 5,414,278 | 5/1995 | Kobayashi et al. | 359/59 |

FOREIGN PATENT DOCUMENTS

| | | |
|---|---|---|
| 0 288 011 A2 | 10/1988 | European Pat. Off. |
| 60-54478 | 3/1985 | Japan . |
| 61-170724 | 8/1986 | Japan ........................................ 359/59 |
| 3-96922 | 4/1991 | Japan ........................................ 359/79 |

OTHER PUBLICATIONS

"12:1: High–Resolution 10.3–in Diagonal Multicolor TFT–LCD", Tsumura et al., SID 91 Digest, pp. 215–218, No Date Provided.

"8.5: Rear–Projection TV Using High–Resolution a–Si TFT–LCD", Kobayashi et al., SID 89 Digest, pp. 114–116, No Date Provided.

*Primary Examiner*—William L. Sikes
*Assistant Examiner*—Tai V. Duong
*Attorney, Agent, or Firm*—Wenderoth, Lind & Ponack, L.L.P.

[57] ABSTRACT

A liquid crystal display panel includes a plurality of signal lines Yj (j=1–N: total signal line number N) and a plurality of scanning lines Xi (i=1–M) arranged in a matrix pattern of N×M, and thin film transistors for switching signal inputs between a display pixel electrode C (i, j) and signal wiring Yj, disposed to correspond to respective intersections of the signal lines and the scanning lines, and auxiliary capacitance Cadd formed in an electrically parallel relationship with the display pixel electrode C (i, j) composed of liquid crystal. The auxiliary capacitance Cadd is formed between the scanning line Xi–1 controlling the display pixel electrode C(i–1, j) at a previous stage of the display pixel electrode C (i, j) and display pixel electrode C (i, j), and disposed n such a positional relationship that the display pixel electrode C (i, j) completely covers the scanning line Xi–1 at the previous stage in a direction of its line width in terms of a cross sectional construction. By the above arrangement, variations of the display pixel signal due to a leaking electric field from the gate line may be reduced.

7 Claims, 9 Drawing Sheets

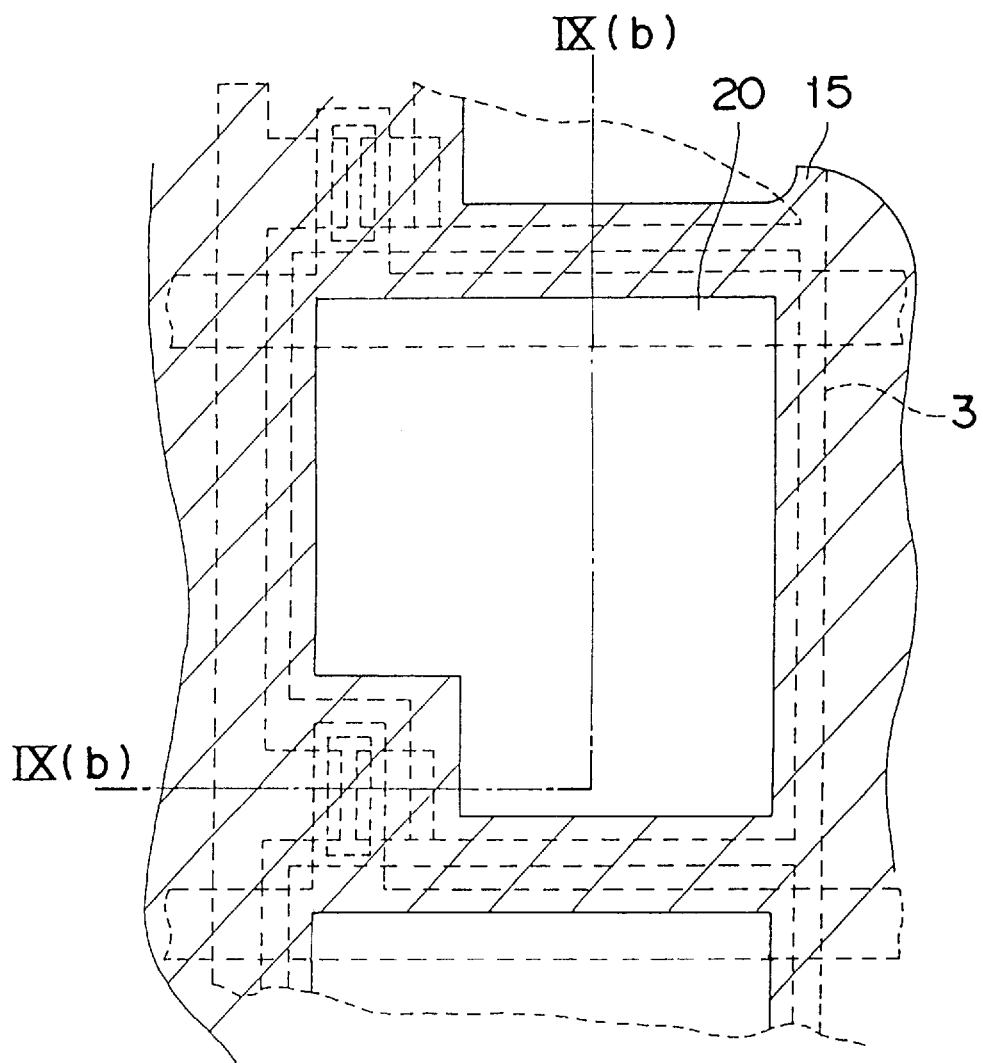

ACTIVE MATRIX LIQUID CRYSTAL HAVING CAPACITANCE ELECTRODES CONNECTED TO PIXEL ELECTRODES

BACKGROUND OF THE INVENTION

1. Field of the Invention

The present invention generally relates to a display device and more particularly, to a liquid crystal display panel employing active elements.

2. Description of the Prior Art

Conventionally, as a transistor array for a liquid crystal display device used for the above purpose, there has been provided an arrangement as shown in FIGS. 2(a) and 2(b), and disclosed, for example, in a paper SID 89 DIGEST p.114 "Rear-Projection TV using High-Resolution a-Si TFT-LCD". More specifically, the array substrate as referred to above includes gate electrode 4 for scanning lines X1–XM, a source electrode 6 for signal lines Y1–YN, and further, thin film transistors (referred to as TFTs hereinafter) 2 formed corresponding to respective intersections, with a drain electrode 7 of the respective TFT being connected to a pixel electrode 3. A liquid crystal material 13 is inserted between a substrate 1 constituting the TFT and a confronting electrode 14, and independent pixels are formed between the pixel electrode 3 and confronting ground electrode 16 provided on the confronting substrate 14, with the liquid crystal material 13 functioning as a capacitance equivalently. There are many cases where an auxiliary capacitance 12 is added in an electrically parallel relationship thereto depending on the need for improving the holding of the signal voltage. For constituting such an auxiliary capacitance, it has been recent trend to form the auxiliary capacitance 12 between the scanning lines 5Xi–1 at a previous stage and said display pixel electrode 3 in order to reduce the number of masks.

However, in the case where the liquid crystal display mode is driven by a normally white mode (referred to as an N.W. mode hereinafter) in which the display is made black during the application of a voltage and is made white during the non-application of a voltage, due to the occurrence of non-uniformity in the electric field within the pixels, there has been a problem in that consequent non-uniformity takes place in the orientation of liquid crystal molecules within the image area, thus resulting in a lowering of the display quality arising from visible irregularity of the display.

Still referring to FIGS. 2(a) and 2(b) showing the conventional TFT-LCD of the previous stage capacitance type, problems taking place in the planar and sectional constructions in the known arrangement will be described hereinafter.

In the conventional arrangement formed with the previous stage auxiliary capacitance 12, the display pixel electrode 3C (i, j) does not perfectly cover the scanning electrode 5Xi–1 at the previous stage in the direction of the line width, and thus, an edge portion of the previous stage electrode 5Xi–1 located close to said display pixel electrode 3C (i, j) is exposed. The exposure of the scanning electrode 5Xi–1 in terms of plane through the insulative layer results in the local lowering of transmission factor due to the non-uniformity of signal potential within the pixels arising from the leakage of the signal potential of the gate into the pixels. More specifically, in the above known arrangement, on the assumption, for example, that the signal applied to the pixel 3C (i, j) is at 4V, and the potential of gate electrode 4Xi and 5Xi is at –9V as an off potential, and the potential of a confronting substrate 14 is at 0V, the potential distribution in the liquid crystal 13 constituting the pixels 3C (i, j) will be represented as shown in FIG. 3, the and thus, non-uniformity of electric field distribution within the pixels 3C (i, j) becomes larger, thereby forming a distribution within one pixel face in a transmittance characteristic of light.

Accordingly, it has been necessary to hide the display from the pixel edge as much as 8 μm in total, i.e., about 4 μm from the edge of the pixel electrode 3 as the non-uniformity portion of the signal potential, and also, about 4 μm as a margin for combining a black matrix disposed at the confronting substrate 14 and the pixel electrode 3. Therefore, there has been such a problem that display aperture ratio of the pixel is lowered as the density becomes higher.

SUMMARY OF THE INVENTION

Accordingly, an essential object of the present invention is to provide a liquid crystal display panel which is so arranged that display potential thereof is not adversely affected by an electric field from the gate electrode of a thin film transistor (referred to as a TFT hereinafter), thereby improving the display quality of a thin film transistor-liquid crystal display (referred to as a TFT-LCD hereinafter).

Another object of the present invention is to provide a liquid crystal display panel of the above described type which is simple in construction and stable in functioning at high reliability, and can be readily manufactured on a large scale at low cost.

In accomplishing these and other object, according to one aspect of the present invention, the liquid crystal display panel has a pattern configuration in which a pixel electrode 3C (i, j) formed, through an inter-layer insulation, with respect to a gate scanning electrode or scanning line 5Xi–1 at the previous stage, covering part of the wiring edge portion at opposite sides of the scanning line Xi–1 at the previous stage by the display pixel electrode C (i, j).

More specifically, according to one preferred embodiment of the present invention, there is provided a liquid crystal display panel which includes a plurality of signal lines Yj (j=1–N: total signal line number N) and a plurality of scanning lines Xi (i=1–M) arranged in a matrix pattern of N×M, and thin film transistors for switching signal inputs between a display pixel electrode C (i, j) and signal wiring Yj, disposed to correspond to respective intersections of said signal lines and an said scanning lines, and auxiliary capacitance Cadd formed in an electrically parallel relationship with the display pixel electrode C(i, j) composed of a liquid crystal material. The auxiliary capacitance Cadd is formed between the scanning line Xi–1 controlling the display pixel electrode C (i–1, j) at a previous stage of said display pixel electrode C (i, j) and said display pixel electrode C (i, j), and disposed in such a positional relationship that said display pixel electrode C (i, j) covering part of the wiring edge portion at opposite sides of the scanning line Xi–1 at the previous stage by the display pixel electrode C (i, j).

By the arrangement according to the present invention as described above, since the pixel electrode 3C (i, j) covering part of the wiring edge portion at opposite sides of the scanning line Xi–1 at the previous stage by the display pixel electrode C (i, j), the gate electrode 5Xi–1 is hidden by the pixel electrode 3C (i, j) as observed in terms of a plane, and the leakage of potentials of the gate electrodes 4 and 5 onto the pixel electrode 3C (i, j) is suppressed. Accordingly, it becomes possible to prevent the non-uniformity of the display potential within the display electrode 3C (i, j) due to the leaking electric field of the gate potential. Moreover, since the width of the black matrix 15 provided on the confronting electrode 14 may be reduced by the amount equivalent to the non-uniformity of the signal as compared with the conventional arrangement, the display portion is to be hidden by 4 μm which is the combining margin between the black matrix 15 and the pixel 3C, and thus, the display aperture ratio of the pixel can be improved by that extent. By way of example, on the assumption that the pixel pitch is 100 μm vertically and 100 μm horizontally, and the display electrode portion is 80 μm longitudinally and 80 μm laterally, the display pixel portion formed with black matrix in the conventional arrangement was 72 μm longitudinally and 72 μm laterally, with the display pixel aperture ratio of 52%. On the contrary, in the construction according to the present invention, the display pixel portion is 76 μm longitudinally and 76 μm laterally, with aperture ratio at 58%, thus showing an improvement of as much as 6% over the conventional construction. The advantage that the width of the black matrix may be made narrower, contributes to the improvement of the aperture ratio as the pixels become higher in density.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1(*b*) is a fragmentary side sectional view on an enlarged scale, of the TFT-LCD of FIG. 1;

FIG. 2(*b*) is a fragmentary side sectional view on an enlarged scale of the conventional TFT-LCD of FIG. 2(*a*);

DETAILED DESCRIPTION OF THE INVENTION

Figure 1A:
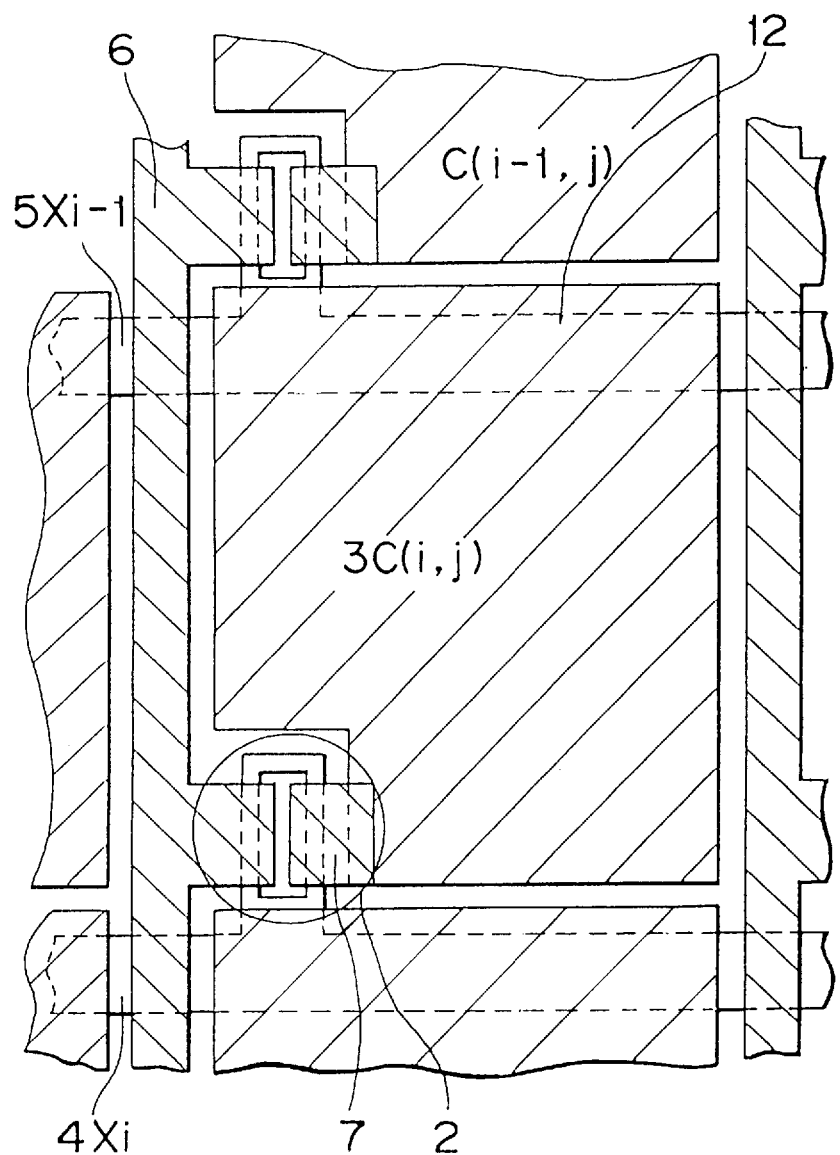
FIG. 1(*a*) is a fragmentary top plane view of a TFT-LCD according to one preferred embodiment of the present invention.

Before the description of the present invention proceeds, it is to be noted that like parts are designated by like reference numerals throughout the accompanying drawings.

Referring now to the drawings, the liquid crystal display device according to the present invention will be described hereinafter.

Figure 1B:
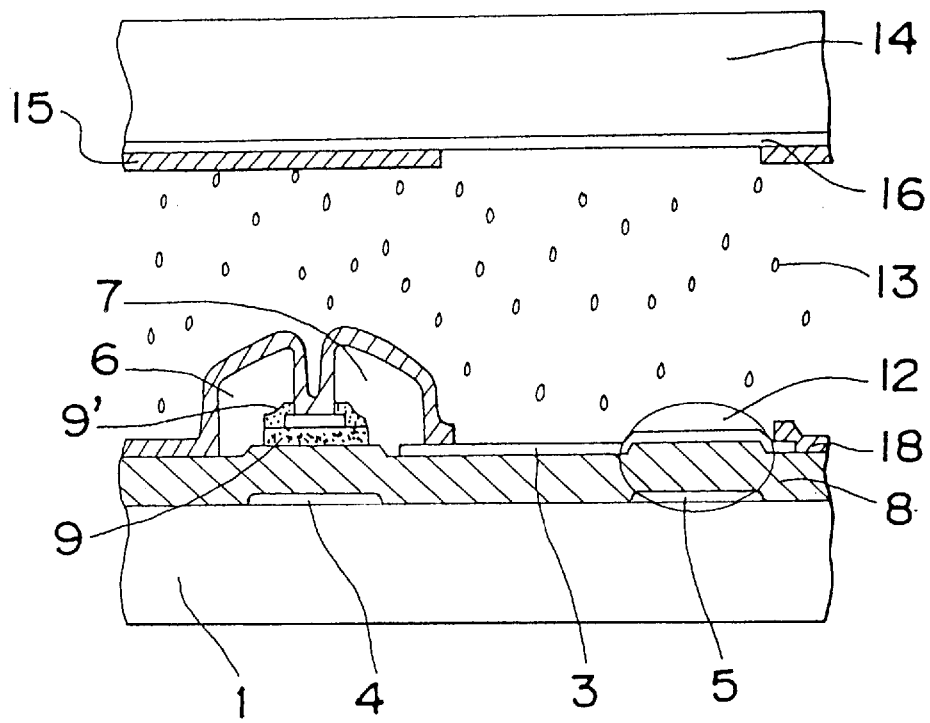
Figure 2A:
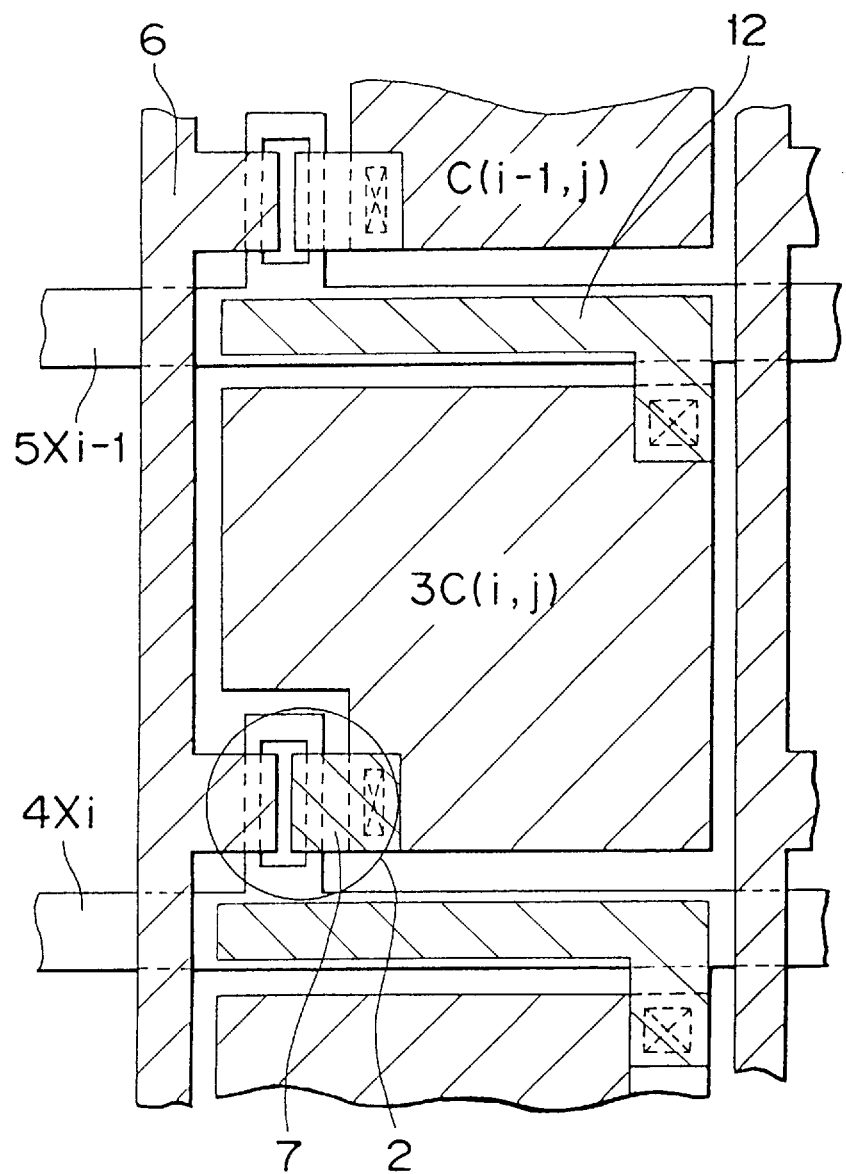
FIG. 2(*a*) is a fragmentary top plane view of a conventional TFT-LCD having a previous stage capacitance.
Figure 2B:
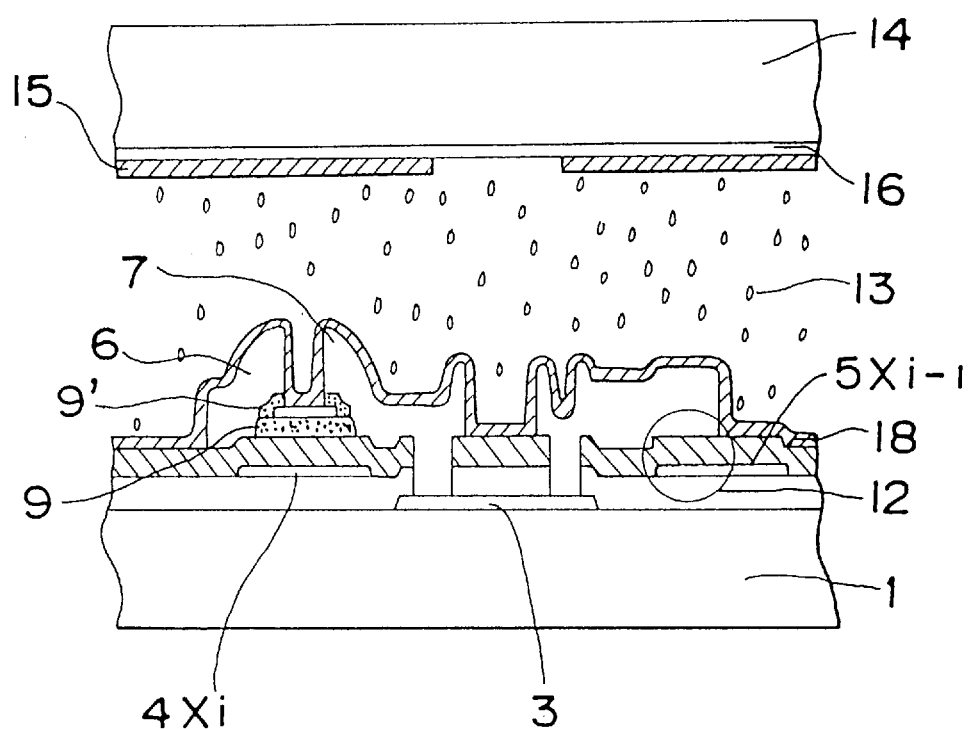
Figure 3:
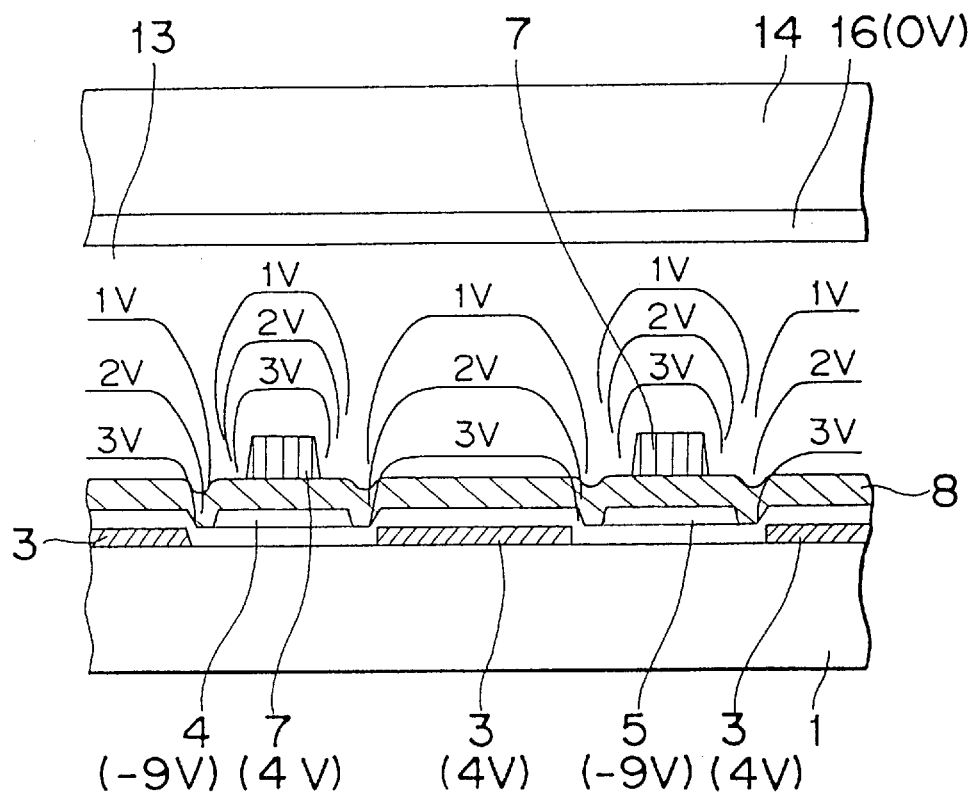
FIG. 3 is a schematic cross-sectional diagram for explaining the non-uniformity of potential distribution in the pixel within a liquid crystal for the conventional arrangement.

FIGS. 1(*a*) and 1(*b*) show the construction of an array for a TFT liquid crystal display device according to one preferred embodiment of the present invention.

As shown in FIGS. 1(*a*) and 1(*b*), by adopting a construction to cover part of the wiring edge portion at opposite sides of the scanning line Xi–1 at the previous stage by the display pixel electrode C (i, j), leakage of electric field from the gate electrode 5Xi–1 can be prevented by shielding, and thus, the uniformity of the potential within the pixel C (i, j) may be improved. In this case, the gate electrode 4 of the TFT 2 for driving the display electrode 3C (i, j) is connected to scanning line 4Xi, and the display pixel 3C (i, j) forms an auxiliary capacitance 12 with respect to the scanning line 5Xi–1 at a previous stage through the gate insulative layer 8.

Figure 4:
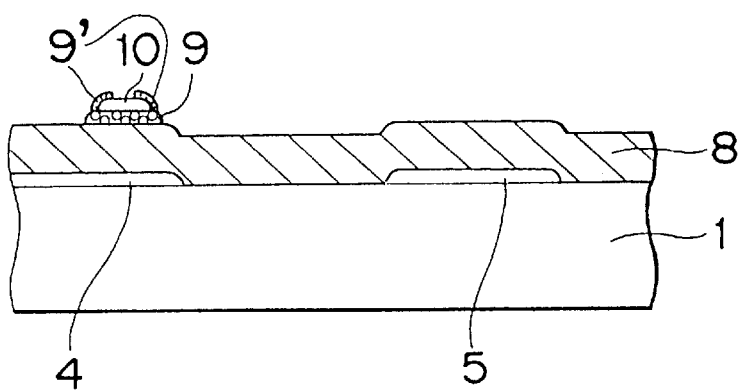
FIG. 4 is a schematic fragmentary cross-section showing a first step for forming the TFT array according to one preferred embodiment of the present invention.
Figure 5:
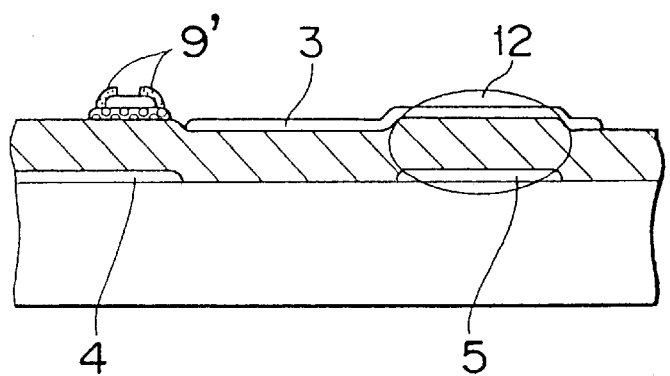
FIG. 5 is a cross-section similar to FIG. 4, which particularly shows a second step therefor.
Figure 6:
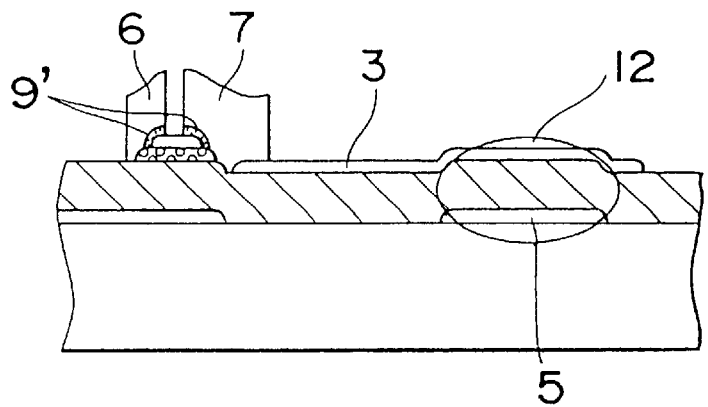
FIG. 6 is a cross-section similar to FIG. 4, which particularly shows a third step therefor.

The planer and side sectional constructions as shown in FIGS. 1(*a*) and 1(*b*) can be achieved by following processes as described hereinbelow. For a first step, a substrate including a transparent substrate 1, and gate electrode 4Xi (i=1–M), 5Xi–1, a gate insulative layer 8 formed by P-CVD method, etc., which are formed on said substrate 1, and a semi-conductor layer 9 with a channel protective layer 10 and another semi-conductor layer 9' doped with impurities for ohmic contact further formed on said semi-conductor layer 9 with a channel protective layer 10 is prepared as shown in FIG. 4. In a second step, when a transparent layer which serves as the pixel electrode 3C (i, j) is formed, it is so arranged that the gate electrode 5Xi–1 at the previous stage is completely covered thereby, so as to form said pixel electrode 3C (i, j) and its auxiliary electrode 12 Cadd as illustrated in FIG. 5. Further, for a third step as shown in FIG. 6, source electrode 6 and drain electrode 7 are formed on the substrate, thereby to forming the TFT array in a matrix pattern. Moreover, in order to improve the reliability of the TFT 2, SiNx18 deposited by a P-CVD method or the like, is formed on said substrate with the pixel portion opened thereon.

As is seen from FIGS. 1(*a*) and 1(*b*), in the positional relationship in the cross-section, between the pixel electrode 3 forming the auxiliary capacitance 12 and the scanning line 5Xi–1 at the previous stage, the pixel electrode 3 covering part of the wiring edge portion at opposite sides of the scanning line Xi–1 at the previous stage by the display pixel electrode C (i, j), which is different from the conventional arrangement.

Figure 7:
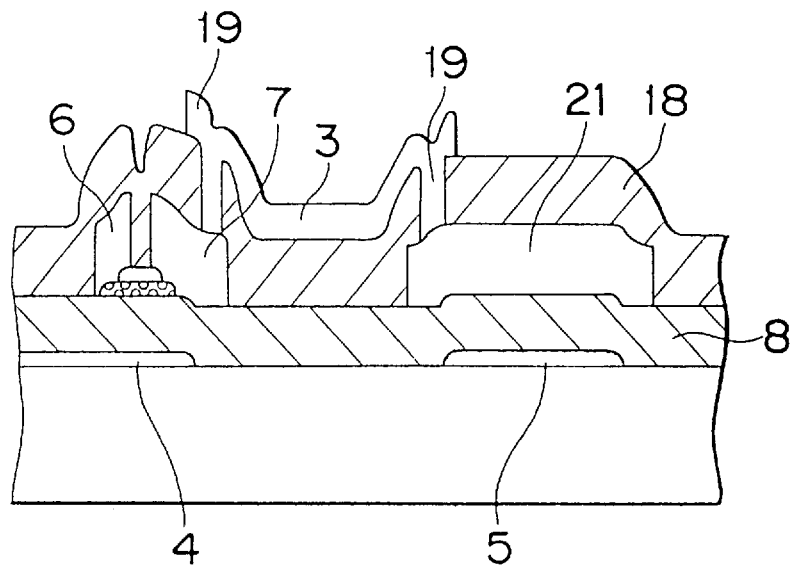
FIG. 7 is a fragmentary cross-sectional view showing a TFT array according to a second embodiment of the present invention.

In a TFT array according to a second embodiment of the present invention as shown in FIG. 7, in the structure of the source electrode 6 and the drain electrode 7, the pixel electrode 3C (i, j) is positioned at the upper layer from the source electrode 6 and the drain electrode 7 through the insulative layer 18, with the gate electrode 5Xi–1 at the previous stage covering part of the wiring edge portion at opposite sides of the scanning line Xi–1 at the previous stage by the auxiliary capacitance electrode 21 connected to the display pixel electrode C(i, j). Moreover, the pixel electrode 3C (i, j) is connected with the drain electrode 7 and capacitance electrode 21 through contact holes 19 formed in the insulative layer 18 located at the lower layer of the pixel electrode 3C (i, j).

Figure 8:
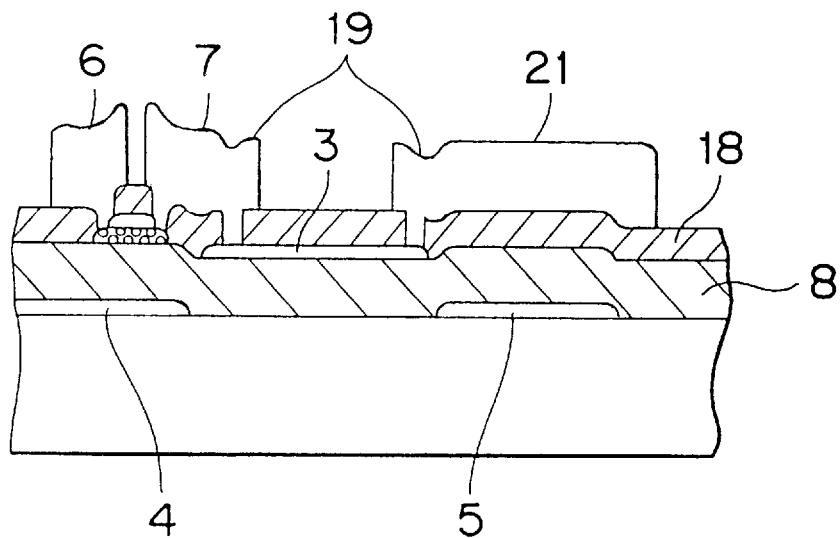
FIG. 8 is also a fragmentary cross-sectional view similar to FIG. 7, which particularly shows a third embodiment of the present invention, FIG. 9(*a*) is a top plane view similar to FIG. 1, which particularly shows a planer positional relationship of a black matrix formed on the TFT-LCD in accordance with an embodiment of the present invention, with respect to the pixel electrode.
Figure 9B:
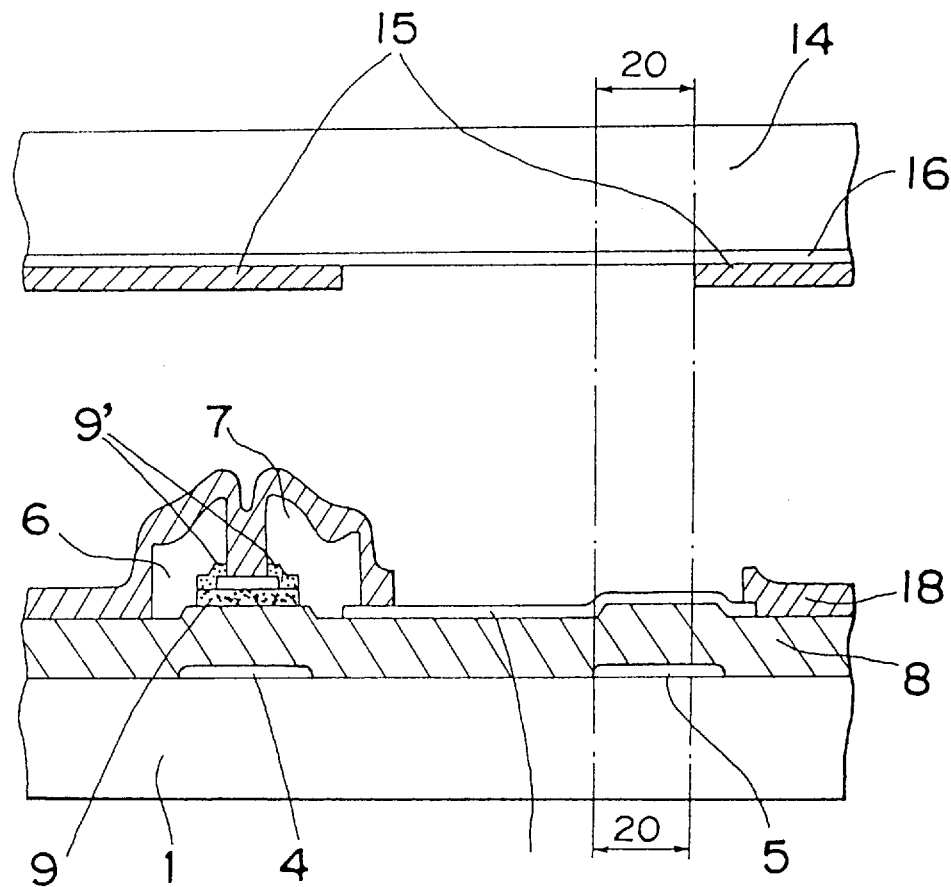
FIG. 9(*b*) is a schematic fragmentary side sectional view taken along the line IX(b)—IX(b) in FIG. 9(*a*), showing a side sectional positional relationship of the black matrix formed on the TFT-LCD in accordance with an embodiment of the present invention, with respect to the pixel electrode.

In a TFT array according to a third embodiment of the present invention as shown in FIG. 8, in the positional relationship in the cross-section, of the pixel electrode 3C (i, j), the source electrode 6, and the drain electrode 7, said pixel electrode 3C (i, j) is located at a lower layer than said source electrode 6, the drain electrode 7, and capacitance electrode 21. The pixel electrode 3 and the drain electrode 7 are connected through contact holes 19 formed in the insulative layer 8 provided on said pixel electrode. In this case, an edge portion of the gate electrode 5Xi-1 at the previous stage near the pixel electrode 3C (i, j) with respect to the direction of line width is covered by the electrode 21 connected to the pixel electrode 3C (i, j) or the gate electrode 5Xi-1 is covering part of the wiring edge portion at opposite sides of the scanning line Xi-1 at the previous stage by the auxiliary capacitance electrode 21 connected to the display pixel electrode C (i, j).

Moreover, in any of the foregoing embodiments, the black matrix may be formed by utilizing the black matrix 15 provided on the confronting substrate 14 holding the liquid crystal 13 with respect to the TFT array substrate, and part of the gate electrode 5Xi-1 covered by the auxiliary electrode 12, by which arrangement, since the gate portion 20 not covered by the black matrix 15 on the confronting substrate 14 is covered by the pixel electrode 3C (i, j), it is a region not affected by the gate electric field. Thus, transmission light is shielded by the gate electrode to serve as the black matrix, and further, owing to the fact that the electric field within the pixels is not affected by the gate electric field, the electric field of the transmission pixel portion may be made uniform.

As is clear from the foregoing description, according to the arrangement of the present invention, the non-uniformity of the potential within the pixels and lowering of the aperture ratio which are the problems in the display quality for the TFT-LCD can be remarkably improved by covering the gate electrode with the pixel electrode. For example, when the black matrix width is held constant, in the case of 100 µm square pitch pixel, the width of the black matrix at 28 µm in the conventional arrangement may be reduced to 24 µm according to the present invention, while in the aperture ratio at 52% can be improved to 58%. Moreover, in the case of 50 µm square pitch, 19% in the conventional example may be improved to 27% according to the present invention. Therefore, the arrangement of the present invention displays more effect as the pixel density becomes higher. Furthermore, since the simple construction is adopted to form the auxiliary capacitance with respect to the scanning line, the TFT array may be constituted without increasing the number of masks, and thus, it becomes possible to improve the display quality not requiring particular cost increase.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A liquid crystal display panel having a base substrate, a confronting substrate and liquid crystal filled between the base substrate and the confronting substrate, said base substrate comprising:

a plurality of elongated signal electrodes extending parallel to each other;

a plurality of elongated scanning electrodes extending parallel to each other and orthogonal to said signal electrodes to define a plurality of rectangular pixel areas, each pixel area enclosed by neighboring first and second signal electrodes and neighboring first and second scanning electrodes, said elongated first scanning electrode having a side edge facing said elongated second scanning electrode;

a substantially planar pixel electrode provided in each pixel area having a side edge juxtaposed to said side edge of said first scanning electrode;

a switching transistor provided between said first signal electrode and said pixel electrode;

an auxiliary capacitance electrode having a first portion overlapping said side edge of said first scanning electrode and a second portion overlapping said side edge of said pixel electrode; and a connecting means for electrically connecting said pixel electrode and said auxiliary capacitance electrode;

wherein said first portion of said auxiliary capacitance electrode overlaps an entire width of said first scanning electrode; and wherein a first insulation layer is disposed between said auxiliary capacitance electrode and said pixel electrode and wherein a second insulation layer is disposed between said first scanning electrode and one of said pixel electrode and said auxiliary capacitance electrode.

2. A liquid crystal display panel as claimed in claim 1, wherein said auxiliary capacitance electrode is located below said pixel electrode.

3. A liquid crystal display panel as claimed in claim 1, wherein said connecting means comprises a connecting portion that extends in a direction substantially perpendicular to a plane of said pixel electrode.

4. A liquid crystal display panel having a base substrate, a confronting substrate and liquid crystal filled between the base substrate and the confronting substrate, said base substrate comprising:

a plurality of elongated signal electrodes extending parallel to each other;

a plurality of elongated scanning electrodes extending parallel to each other and orthogonal to said signal electrodes to define a plurality of rectangular pixel areas, each pixel area enclosed by neighboring first and second signal electrodes and neighboring first and second scanning electrodes, said elongated first scanning electrode having a side edge facing said elongated second scanning electrode;

a pixel electrode provided in each pixel area having a side edge juxtaposed to said side edge of said first scanning electrode;

a switching transistor provided between said first signal electrode and said pixel electrode;

an auxiliary capacitance electrode having a first portion overlapping an entire width of said first scanning electrode and a second portion overlapping said side edge of said pixel electrode;

a connecting means for electrically connecting said pixel electrode and said auxiliary capacitance electrode;

an insulation layer disposed between said scanning electrodes and said pixel electrodes; and another insulation layer disposed directly above said pixel electrode such that said pixel electrode is directly interposed between said insulation layer and said another insulation layer.

5. A liquid crystal display panel having a base substrate, a confronting substrate and liquid crystal filled between the base substrate and the confronting substrate, said base substrate comprising:

a plurality of elongated signal electrodes extending parallel to each other;

a plurality of elongated scanning electrodes extending parallel to each other and orthogonal to said signal electrodes to define a plurality of rectangular pixel areas, each pixel area enclosed by neighboring first and second signal electrodes and neighboring first and second scanning electrodes, said elongated first scanning electrode having a side edge facing said elongated second scanning electrode;

a pixel electrode provided in each pixel area having a side edge juxtaposed to said side edge of said first scanning electrode;

a switching transistor provided between said first signal electrode and said pixel electrode;

an auxiliary capacitance electrode having a first portion overlapping said side edge of said first scanning electrode and a second portion overlapping said side edge of said pixel electrode;

a connecting means for electrically connecting said pixel electrode and said auxiliary capacitance electrode;

an insulation layer disposed between said scanning electrodes and said pixel electrodes; and another insulation layer disposed directly above said pixel electrode such that said pixel electrode is directly interposed between said insulation layer and said another insulation layer;

wherein said connecting means comprises an electrode extending through a through-hole formed in said another insulating layer.

6. A liquid crystal display panel having a base substrate, a confronting substrate and liquid crystal filled between the base substrate and the confronting substrate, said base substrate comprising:

a plurality of elongated signal electrodes extending parallel to each other;

a plurality of elongated scanning electrodes extending parallel to each other and orthogonal to said signal electrodes to define a plurality of rectangular pixel areas, each pixel area enclosed by neighboring first and second signal electrodes and neighboring first and second scanning electrodes, said elongated first scanning electrode having a side edge facing said elongated second scanning electrode;

a substantially planar pixel electrode provided in each pixel area having a side edge juxtaposed to said side edge of said first scanning electrode;

a switching transistor provided between said first signal electrode and said pixel electrode;

an auxiliary capacitance electrode having a first portion overlapping said side edge of said first scanning electrode and a second portion overlapping said side edge of said pixel electrode; and a connecting means for electrically connecting said pixel electrode and said auxiliary capacitance electrode;

wherein said first portion of said auxiliary capacitance electrode overlaps an entire width of said first scanning electrode; and wherein said auxiliary capacitance electrode is located above said pixel electrode.

7. A liquid crystal display panel having a base substrate, a confronting substrate and liquid crystal filled between the base substrate and the confronting substrate, said base substrate comprising:

a plurality of elongated signal electrodes extending parallel to each other;

a plurality of elongated scanning electrodes extending parallel to each other and orthogonal to said signal electrodes to define a plurality of rectangular pixel areas, each pixel area enclosed by neighboring first and second signal electrodes and neighboring first and second scanning electrodes, said elongated first scanning electrode having a side edge facing said elongated second scanning electrode;

a pixel electrode provided in each pixel area having a side edge juxtaposed to said side edge of said first scanning electrode;

a switching transistor provided between said first signal electrode and said pixel electrode;

an auxiliary capacitance electrode having a first portion overlapping said side edge of said first scanning electrode and a second portion overlapping said side edge of said pixel electrode;

a connecting means for electrically connecting said pixel electrode and said auxiliary capacitance electrode;

an insulation layer disposed between said scanning electrodes and said pixel electrodes;

another insulation layer disposed directly above said pixel electrode such that said pixel electrode is directly interposed between said insulation layer and said another insulation layer;

wherein said auxiliary capacitance electrode extends above said another insulation layer.

* * * * *